United States Patent
Markarian et al.

[15] 3,662,236
[45] May 9, 1972

[54] CAPACITOR IN A SEALED METAL CASE

[72] Inventors: Mark Markarian, Williamstown; Robert J. McDonough, North Adams, both of Mass.

[73] Assignee: Sprague Electric Company, North Adams, Mass.

[22] Filed: Mar. 12, 1971

[21] Appl. No.: 123,722

[52] U.S. Cl. ........................ 317/260, 174/52 S, 29/25.42
[51] Int. Cl. ............................................. H01g 1/02
[58] Field of Search .................... 317/242, 260; 174/525; 29/25.42

[56] References Cited

UNITED STATES PATENTS 3,015,759   1/1962   Bugel ........................... 317/200 X
3,301,270   1/1967   Horn ............................. 174/52.5

Primary Examiner—E. A. Goldberg
Attorney—Connolly & Hutz and Vincent H. Sweeney

[57] ABSTRACT

An integral rigid axial electrical connector extends from an electrode of a capacitance section through an insulating plug closure in the open end of a metal casing. The connector provides a fluid tight seal with the insulating plug and serves as the mandrel on which the capacitance section is rolled.

7 Claims, 4 Drawing Figures

PATENTED MAY 9 1972 3,662,236
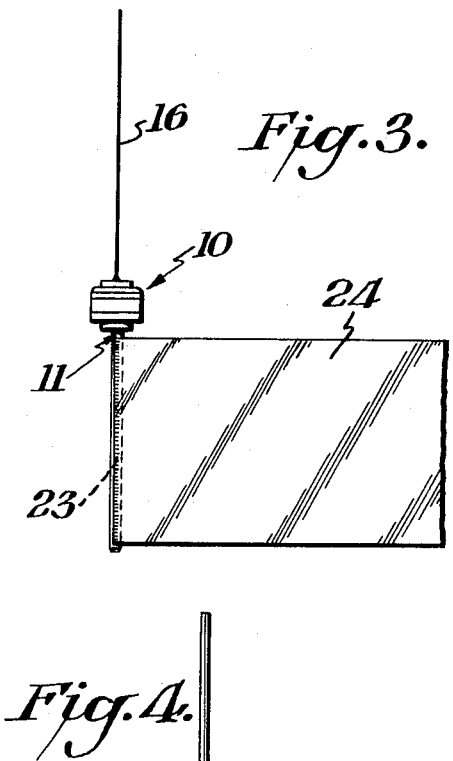
Fig.3.
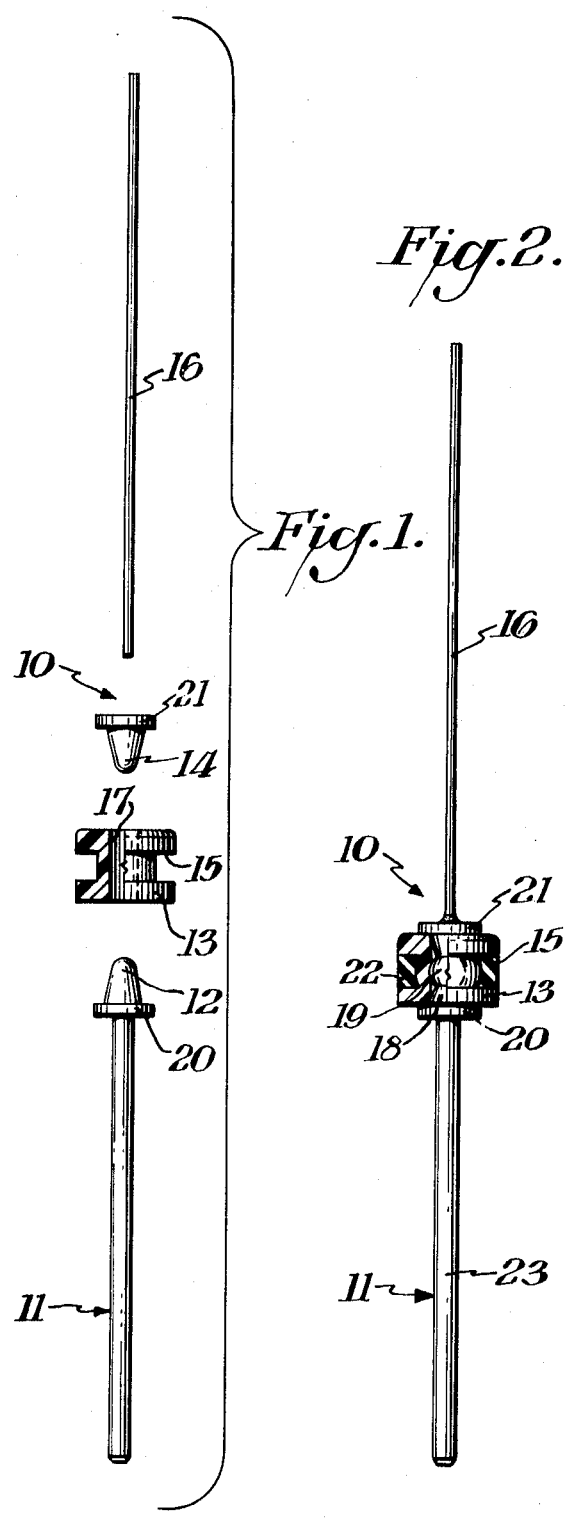
Fig.1.
Fig.2.
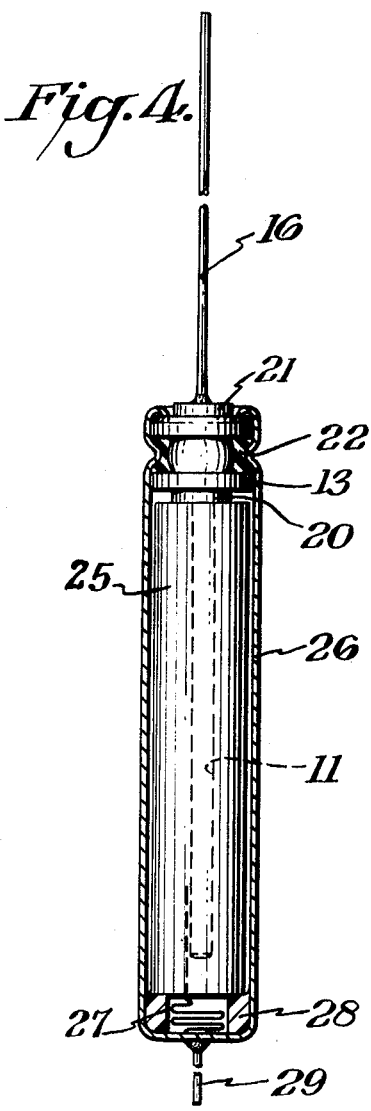
Fig.4.

CAPACITOR IN A SEALED METAL CASE

BACKGROUND OF THE INVENTION

The present invention relates to a capacitor contained in a metal casing and having a connection to one of its electrodes through the end closure of the casing, and more particularly to the provision of a rolled capacitor having a shock-resistant fluid-tight means for making the connection through the end closure while facilitating the assembly of the capacitor.

Rolled capacitors contain fluid materials which are impregnated into the capacitor section to provide desired electrical properties. It is important to prevent the escape of such fluid in both liquid and gaseous states from the capacitor during use. This use may include subjecting the capacitor to rough physical treatment and particularly to vibration and other physical shock. It is important that the capacitor be capable of withstanding such extreme physical treatment without diminution of the vital electrical characteristics or without involving a complicated assembly.

One object of this invention is to provide a capacitor having improved vibration resistance.

Another object of this invention is to provide an integral connection to one of the capacitor electrodes through the closure of the capacitor container.

Another object of this invention is to provide an improved connector construction which assists and simplifies the convolutely wound capacitor assembly.

SUMMARY OF THE INVENTION

A rolled capacitor in a metal casing has a straight rigid electrical connector made up of a mandrel and an enlarged rivet-like end extending axially through the insulated plug closing the metal casing. The capacitance section is rolled on the mandrel and the rivet-like end is sealed within the insulating plug to provide a terminal surface on the outside of the terminal plug to which a lead wire may be suitably attached. The rivet-like end is formed by welding the end of the mandrel to a flange insert in a central passage through the insulating plug so as to form the tight seal between the axial connector and the plug.

The combined connector and plug assembly may be inserted in the rolling apparatus when the section is rolled on the mandrel.

BRIEF DESCRIPTION OF THE DRAWING

FIG. 1 is an exploded view in elevation of an electrical connector provided in accordance with this invention;

FIG. 2 is an elevational view partially in section of the assembled electrical connector of FIG. 1;

FIG. 3 is an elevational view of the electrical connector with a capacitor electrode attached; and FIG. 4 is a view in section of an assembled capacitor in accordance with the invention.

DETAILED DESCRIPTION OF THE INVENTION

Convolutely wound capacitors are well known in the art and comprise capacitance sections having electrodes separated by spacer material having dielectric properties. It is also known to seal these sections in metal containers having one open end which is sealed closed by a stopper or plug positioned in the orifice of the container. The plug is in fluid tight engagement with the container at the orifice. The electrodes are electrically connected by separate conductors attached to the respective electrodes which conductors extend from the capacitance section. One conductor is generally attached to the metal container and the other conductor generally extends to and through the closure plug.

The present invention involves a capacitance section in a casing wherein the section has a straight rigid electrical connector from one of the electrodes of the section secured in the closure plug of the casing. The connector comprises a stiff mandrel around which the convolutely wound section is rolled and an enlarged river-like end which is fluid tight engagement with the plug closing the open end of the casing.

FIG. 1 shows the component parts of the straight rigid electrical connector 10 in an exploded view. A mandrel 11 has integrally formed at its upper end a flange 20 and a knob 12. A recessed plug 13 is positioned between the knob 12 and a flanged insert 14. The plug 13 is preferably composed of Teflon and is circumferentially recessed with a groove 15. A lead wire 16 is adjacent the insert 14. The plug 13 has a central passage 17. The mandrel 11 with knob 12 on its end, the passage 17, and the insert 14 are depicted in FIG. 1 all aligned representing the straight alignment of the component parts of the electrical connector 10.

The knob 12 and insert 14 are joined to form a thick rivet-like end 18 of the connector 10 as shown in FIG. 2. The junction is obtained by inserting the ends of parts 12 and 14 into the passage 17 and butt welding under current and pressure to unite them with their respective insert flanges bearing against the flat radial surfaces of the plug 13. By this welding operation the knob 12 and insert 14 are formed into the end 18 with an enlarged joint 19 at the place of the junction in the passage 17. This enlarged joint 19 is larger in diameter than the passage 17 to exert great pressure on the walls thereof and form a very fluid-tight engagement between the wall of passage 17 and the connector end 18. The lead wire 16 is butt welded to the connector 10.

The operation of butt welding the knob 12 and insert 14 to form the joint 18 within the plug 13 also serves to modify the contact between the thick connector end 18 and the plug 13 so that the plug 13 adheres to the end 18. Similarly, the flanges 20 and 21 compressed against the radial surfaces of the plug 13 are firmly attached to the plug 13. A fluid tight seal is achieved between the axial connector 10 and the plug 13.

The plug and connector assembly is completed as shown in FIG. 2 with a resilient annular ring 22 seated within the groove 15.

In order to produce the rolled body of the capacitor of this invention the mandrel portion 11 of the connector 10 is used as a winding mandrel. As shown in FIG. 3, the mandrel 11 is attached to the capacitor electrode 24 by cold welding the electrode to the surface 23 of the mandrel 11 and the electrode and the other electrode and the dielectric spacers are rolled as by placing the connector 10 in a chuck of a suitable rolling machine and wound into a compact section. In the preferred embodiment, the anode electrode 24 is wound on the connector 10 after the connector has been assembled within the insulating plug 13.

In FIG. 4 a completed capacitance section 25 is shown assembled in a casing 26 with the plug 13 closing the orifice at the open end of the casing 26 by having the wall of the casing 26 crimped into a concave bead indented into the ring 22 and the upper rim of the casing 26 rolled over to compress against the upper surface of the plug 13. Thus, the plug 13 effectively seals the capacitor container against fluid loss.

At the inner end of the section 25 a tab 27 from the other electrode of section 25 is welded to the inside surface of the bottom of the casing 26 and thus connects the other electrode, not shown, to the casing 26. The casing 26 is insulated from the connector 10 by the non-conductive property of the plug 13. The capacitance section 25 is seated on an insulating spacer 28 at the bottom of the inner end of the casing 26 to further improve the vibration resistance of the capacitor. A lead wire 29 is welded to the outside surface of the casing 26 opposite the weld of tab 27.

The construction of the present invention can be used for other capacitor types where an electrode connection is needed from within a metal container through an insulating plug. While in the described preferred embodiment the section is wound on the assembled connector and plug, the winding could be done before the connector is assembled with the plug.

Among other advantages of this invention is the superior resistance to vibration including the ability to withstand 70G without failure. The features of the integral, rigid, axial connector are obtained without adding steps to the assembly procedure. A key feature is the rigidity of the integral connector along the capacitor axis. Also a fluid gas-tight seal between the connector and the plug is assured.

What is claimed is:

1. A capacitor having in combination a capacitance section made up of a pair of conductive electrodes separated by dielectric material and disposed in a metallic can sealed by a can closure, an integral stiff connector having a mandrel member attached to one of the electrodes within the section and having an enlarged rivet end in the can closure, the connector extending axially through the can closure and so constructed and arranged that the enlarged rivet end is pressed into tight engagement with the closure, and an end surface of the axial connector extending out of the can.

2. A capacitor as claimed in claim 1 wherein the closure is an insulating plug and the enlarged rivet end is in pressure engagement with the plug.

3. A capacitor as claimed in claim 2 wherein radial flanges on the connector bear against radial surfaces of the plug.

4. A capacitor as claimed in claim 1 wherein the mandrel member is provided at one end with a knob, and the enlarged rivet end includes the knob butt welded to an insert in the can closure.

5. A capacitor as claimed in claim 1 wherein external lead wires are attached in axial alignment to the end surface and to the bottom of the can, and a tab from the other of the pair of electrodes is attached to the can.

6. A capacitor as claimed in claim 5 wherein the section is seated on an insulating spacer at the bottom of the can, and the tab extends through the spacer into the attachment to the can.

7. A process for making a convolutely wound capacitor comprising the steps of forming an electrical connector consisting of a mandrel having at one end a knob, providing an insulating plug having a central passage and an insert with a radial flange and a shank proportioned to fit in the passage, joining the knob and the shank in the passage to provide an enlarged rivet end within the passage, joining a capacitor electrode foil to the mandrel, convolutely winding the attached foil with suitable spacers and another electrode to produce a capacitance unit, inserting the capacitance unit in a metal container and attaching the other electrode to the inner surface of the container by a tab.

* * * * *